(No Model.)
W. SEARS.
ELECTRIC CIRCUIT CLOSING DEVICE.
No. 501,258. Patented July 11, 1893.
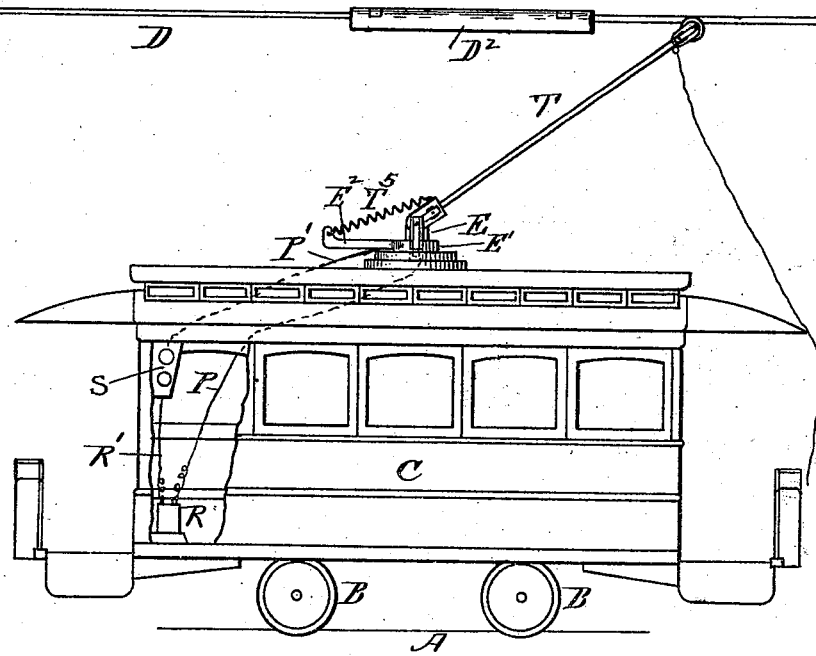
Fig. 1.
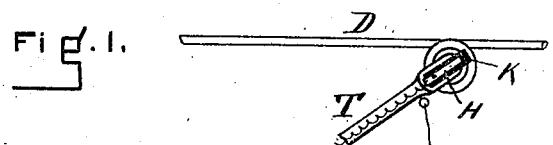
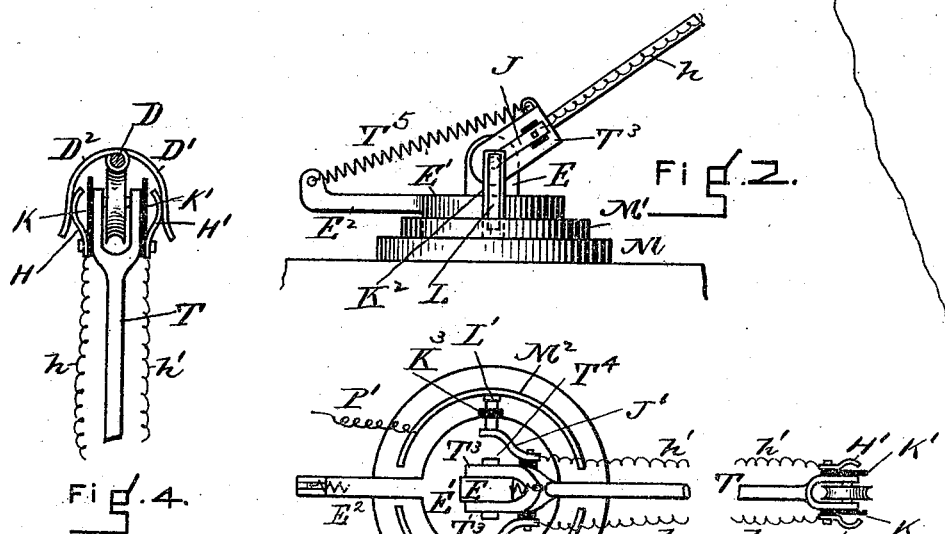
Fig. 4.
Fig. 2.
Fig. 3.
WITNESSES
William Eason
George S. Lee
INVENTOR.
William Sears

UNITED STATES PATENT OFFICE.

WILLIAM SEARS, OF BOSTON, MASSACHUSETTS.

ELECTRIC-CIRCUIT-CLOSING DEVICE.

SPECIFICATION forming part of Letters Patent No. 501,258, dated July 11, 1893.

Application filed April 10, 1893. Serial No. 469,799. (No model.)

*To all whom it may concern:*

Be it known that I, WILLIAM SEARS, of Boston, in the county of Suffolk and State of Massachusetts, have invented a new and useful Improvement in Electric-Circuit-Closing Devices, of which the following, taken in connection with the accompanying drawings, is a specification.

This invention relates to an electric circuit closing device, especially adapted for use in electrically propelled passenger cars, for the purpose of changing the signs by which the street at which the car is at, or approaching, may be known to the passengers.

My invention is illustrated in the accompanying drawings, in which—

Figure 1 is an elevation showing a car with my device attached. Fig. 2 shows in elevation the parts that are more immediately connected to the trolley. Fig. 3 is a plan showing the same parts that are shown in Fig. 2. Fig. 4 shows in detail parts that are connected with the top of the trolley pole, and parts connected with the trolley wire.

In the drawings, C represents a car body of ordinary construction, and adapted to run on an electric road, A being the track, B B the car wheels, T the trolley pole, and D the trolley wire.

Within the car an automatic signal device S is placed in such a position that its signal may be readily seen by the passengers. The device is intended to show a sign bearing a name which shall indicate that the next stop made by the car will be at the street or station indicated by the said name. The signal device S is operated electrically by a battery, shown at R, the electric circuit being normally open; but it is closed at intervals, that is, at such locations on the line of the road as it may be desirable to change the signal or sign.

I will now describe my device for closing the circuit, and thus cause the proper sign to be displayed. The trolley pole T has a forked end $T^3 T^3$ (see Fig. 3), by means of which, and a pivot pin $T^4$, it is attached to a standard E attached to a swiveling base E', said swiveling base being in turn connected by a vertical trunnion pin (not shown) to the trunnion block M attached to the top of the car. The trolley pole T is held up by a spring $T^5$ which is connected to an arm $E^2$, extending from the swiveling base E' as shown. My electric current, starting from the battery R over wire R' goes to the signal S (see Fig. 1), thence by the wire P' (see Figs. 1 and 2) to a contact plate $M^2$. This contact plate $M^2$ is in the form of an arc of a circle, and is attached to, but insulated from, the block M. On the same block M a second contact plate M' is attached (see Fig. 3); these two contact plates $M^2$ and M' are placed in a circle, the center of which coincides with the center about which the trolley pole swings on its vertical axis. The second contact plate, M', is connected by the wire P to the battery R, so that when the two contact plates $M^2$ and M' are electrically connected, an electric circuit will be established from the battery R to the signal device S, and it will be operated.

For electrically connecting the plates M' $M^2$, I have the following described arrangement: Upon the swiveling base E' I have arms L L' (both shown on Fig. 3 and one shown on Fig. 2); these arms are firmly attached to, but insulated from, (by the pieces $K^2 K^3$,) the swiveling base E'. The lower ends of these arms L L' are in rubbing electrical contact with the contact plates M' $M^2$ respectively, and the upper ends are bent so as to pass through the insulating pieces $K^2 K^3$ so that they may come in contact with the plates J J' attached to the lower end $T^3$ of the trolley pole (see Figs. 2 and 3.) The plates J J' are insulated, and are so located in relation to the horizontal pivot $T^4$ (that is the horizontal axis) of the trolley pole that their lower ends will not swing off from contact with the bent ends of the contact plates L L'. (See Fig. 3.) The plates L L' are respectively connected by the wires h h' (Figs. 2 and 4) to the insulated plates H and H', attached to the insulating blocks K K' at the upper end of the trolley pole. To complete the electric circuit, it is only necessary to electrically join the plates H and H'. This occurs when the upper end of the trolley pole arrives at circuit closers D' $D^2$. (See Figs. 1 and 4). These circuit closers are located at such points as it is desirable to change the signs in the car. They consist of two hinged or spring plates D' $D^2$, Fig. 4, electrically connected to each other, and adapted to embrace the two contact plates H H' on the trolley pole, and thus complete the circuit through the battery R and the signal device S.

I claim—

1. In an electric circuit closing device, the combination of a trolley pole having electric contact plates insulated from each other, and adapted to engage in electrical contact with the circuit closers $D'\ D^2$: with circuit closers $D'\ D^2$ placed in the path traveled by the head of the trolley pole, and adapted to operate substantially as described and for the purpose set forth.

2. In an electric circuit closing device, the combination of contact plates J J' attached to the lower end of the trolley pole and insulated from it, and adapted to form a constant electric connection with the contact plates L L', said contact plates L L' being attached to the swiveling base upon which the trolley pole is mounted, and adapted to electrically connect with the stationary curved contact plates $M'\ M^2$: with the curved contact plates $M'\ M^2$, said plates $M'\ M^2$ being in electrical connection with the battery and signal device, substantially as and for the purpose set forth.

In testimony whereof I have signed my name to this specification, in the presence of two subscribing witnesses, on this 8th day of April, A. D. 1893.

WILLIAM SEARS.

Witnesses:
FRANK G. PARKER,
WILLIAM EASON.